(12) United States Patent
Tarte et al.

(10) Patent No.: US 9,060,381 B2
(45) Date of Patent: Jun. 16, 2015

(54) IN-VEHICLE COMMUNICATION DEVICE WITH SOCIAL NETWORKING

(75) Inventors: Christopher Tarte, Roanoke, TX (US);
Erik M. Binns, Corinth, TX (US);
Matthew A. Cullum, Denton, TX (US);
Wesley M. Mays, Coppell, TX (US)

(73) Assignee: PACCAR Inc, Bellevue, WA (US)

( * ) Notice: Subject to any disclaimer, the term of this patent is extended or adjusted under 35 U.S.C. 154(b) by 1194 days.

(21) Appl. No.: 12/701,765

(22) Filed: Feb. 8, 2010

(65) Prior Publication Data
US 2011/0196969 A1 Aug. 11, 2011

(51) Int. Cl.
| G06F 15/16 | (2006.01) |
| H04W 84/08 | (2009.01) |
| H04N 21/414 | (2011.01) |
| H04N 21/4788 | (2011.01) |
| H04W 4/06 | (2009.01) |

(52) U.S. Cl.
CPC ......... *H04W 84/08* (2013.01); *H04N 21/41422* (2013.01); *H04N 21/4788* (2013.01); *H04W 4/06* (2013.01)

(58) Field of Classification Search
CPC ... H04W 4/06; H04W 84/08; H04N 21/4788; H04N 21/41422
USPC .................................................. 709/201–253
See application file for complete search history.

(56) References Cited

U.S. PATENT DOCUMENTS

| 4,887,086 A | 12/1989 | Unser |
| 5,884,218 A * | 3/1999 | Nimura et al. ................ 701/428 |
| 6,356,822 B1 | 3/2002 | Diaz |
| 6,362,748 B1 * | 3/2002 | Huang ........................... 340/901 |
| 6,366,651 B1 * | 4/2002 | Griffith et al. ............. 379/88.14 |
| 6,427,101 B1 | 7/2002 | Diaz |
| 6,430,486 B1 | 8/2002 | Diaz |
| 6,477,366 B1 | 11/2002 | Valentine |
| 6,539,296 B2 | 3/2003 | Diaz |
| 6,647,270 B1 * | 11/2003 | Himmelstein ............. 455/456.1 |
| 6,714,793 B1 * | 3/2004 | Carey et al. .................. 455/466 |
| 6,885,874 B2 * | 4/2005 | Grube et al. ................. 455/520 |
| 6,892,201 B2 * | 5/2005 | Brown et al. ........................ 1/1 |
| 6,934,697 B1 * | 8/2005 | Warren ................................ 1/1 |
| 6,959,173 B2 * | 10/2005 | Kawai ............................. 455/95 |
| 7,010,751 B2 * | 3/2006 | Shneiderman ............... 715/232 |

(Continued)

FOREIGN PATENT DOCUMENTS

JP 2000-68884 A 3/2000

*Primary Examiner* — Sargon Nano
(74) *Attorney, Agent, or Firm* — Christensen O'Connor Johnson Kindness PLLC

(57) ABSTRACT

Generally described, aspects of the disclosed subject matter are directed to managing communications from a mobile device. In accordance with one embodiment, a method for establishing a communication session with a contact is provided. The method includes causing information about at least one contact associated with the user to be displayed on the mobile device and receiving input to initiate a communication session with the contact. Then, if the identified contact is associated with a CB radio, a CB based communication session is established in which audio is transmitted and received from the mobile device using a CB radio communication unit. On the other hand, if the identified contact is associated with a remote device capable of performing data-based communications, a data-based communication session is established and which data is transmitted and received in accordance with IP-based protocols.

12 Claims, 7 Drawing Sheets

(56) References Cited

U.S. PATENT DOCUMENTS

| | | | |
|---|---|---|---|
| 7,061,366 B2 * | 6/2006 | Bell et al. | 340/5.2 |
| 7,092,723 B2 * | 8/2006 | Himmelstein | 455/456.1 |
| 7,116,985 B2 * | 10/2006 | Wilson et al. | 455/456.1 |
| 7,123,926 B2 * | 10/2006 | Himmelstein | 455/456.1 |
| 7,251,252 B2 | 7/2007 | Norby | |
| 7,272,563 B2 * | 9/2007 | Nelson | 704/270 |
| 7,363,117 B2 | 4/2008 | Tengler | |
| 7,596,636 B2 * | 9/2009 | Gormley | 710/8 |
| 7,983,811 B2 * | 7/2011 | Basir et al. | 701/32.2 |
| 8,078,397 B1 * | 12/2011 | Zilka | 701/414 |
| 8,255,154 B2 * | 8/2012 | Zilka | 701/408 |
| 8,350,721 B2 * | 1/2013 | Carr | 340/903 |
| 8,526,587 B2 * | 9/2013 | Uhler et al. | 379/202.01 |
| 8,660,897 B2 * | 2/2014 | Abhyanker | 705/14.64 |
| 2002/0032507 A1 | 3/2002 | Diaz | |
| 2002/0042670 A1 | 4/2002 | Diaz | |
| 2002/0049523 A1 | 4/2002 | Diaz | |
| 2002/0191639 A1 | 12/2002 | Norby | |
| 2004/0082340 A1 * | 4/2004 | Eisinger | 455/456.1 |
| 2006/0123053 A1 * | 6/2006 | Scannell | 707/104.1 |
| 2006/0193301 A1 * | 8/2006 | Cheng et al. | 370/338 |
| 2007/0082678 A1 * | 4/2007 | Himmelstein | 455/456.1 |
| 2007/0087756 A1 * | 4/2007 | Hoffberg | 455/450 |
| 2007/0110017 A1 | 5/2007 | Fulknier | |
| 2007/0156883 A1 * | 7/2007 | Thompson et al. | 709/223 |
| 2007/0162550 A1 * | 7/2007 | Rosenberg | 709/206 |
| 2007/0190956 A1 * | 8/2007 | Chen et al. | 455/230 |
| 2007/0285280 A1 * | 12/2007 | Robinson et al. | 340/928 |
| 2008/0163312 A1 * | 7/2008 | Faust et al. | 725/93 |
| 2008/0233895 A1 | 9/2008 | Bizer | |
| 2008/0297585 A1 * | 12/2008 | Chung et al. | 348/14.02 |
| 2009/0203319 A1 * | 8/2009 | Sandoval et al. | 455/41.3 |
| 2010/0056109 A1 * | 3/2010 | Wilson et al. | 455/412.1 |
| 2010/0114783 A1 * | 5/2010 | Spolar | 705/80 |
| 2010/0161720 A1 * | 6/2010 | Colligan et al. | 709/203 |
| 2011/0121991 A1 * | 5/2011 | Basir | 340/902 |
| 2012/0190386 A1 * | 7/2012 | Anderson | 455/456.3 |
| 2014/0172727 A1 * | 6/2014 | Abhyanker et al. | 705/307 |

\* cited by examiner

IN-VEHICLE COMMUNICATION DEVICE WITH SOCIAL NETWORKING

BACKGROUND

The Citizens Band ("CB") Radio Service is a system of short-distance radio communications performed on a subset of public radio channels. These services began in the 1940's to provide individuals and businesses a radio band for personal communications. Like most two-way radio services, CB channels are shared by many users but only one station may transmit at a time. Other stations must listen and wait for the shared channel to be available. Moreover, users such as vehicle operators may be limited to performing audio-only communications over a short range using a radio-band that is publicly accessible.

In contrast to the CB Radio Service, wireless networking technologies have experienced explosive growth in both the number of subscribers as well as available features. Generally described, the infrastructure that enables wireless networking consists of hardware (i.e., servers, routers, antennas, etc.), network services, software, and related components. Continuing advancements in this infrastructure is increasing the use and overall role that wireless networking serves in both the business and social landscape. For example, while first generation mobile telephony was limited to audio communications, users are now able to participate in other types of data-based communications such as e-mail, instant messaging, multimedia streaming, etc.

Existing devices are limited in their ability to perform communications over different types of communication systems. For example, wireless telephones are not configured to exchange communications over CB radio bands with a CB radio. In addition, existing CB radios are limited to audio-only communications and have not leveraged emerging wireless networking technologies. As a result, enhanced features that allow multimedia communications are not available using existing CB radios. To address these and other drawbacks, consumers would benefit from a more versatile device that is capable of communicating over CB radio bands as well as the emerging wireless infrastructure.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, aspects of the disclosed subject matter are directed to managing communications from a mobile device. In accordance with one embodiment, a method for establishing a communication session with a contact is provided. The method includes causing information about at least one contact associated with the user to be displayed on the mobile device and receiving input to initiate a communication session with the contact. Then, if the identified contact is associated with a CB radio, a CB based communication session is established in which audio is transmitted and received from the mobile device using a CB radio communication unit. On the other hand, if the identified contact is associated with a remote device capable of performing data-based communications, a data-based communication session is established in which data is transmitted and received in accordance with appropriate protocols, such as IP-based protocols, etc.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. In this regard, the following disclosure first provides a general description of a system in which the disclosed subject matter may be implemented. Then, an exemplary routine for initiating communications between remote devices is described. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

Figure 1:
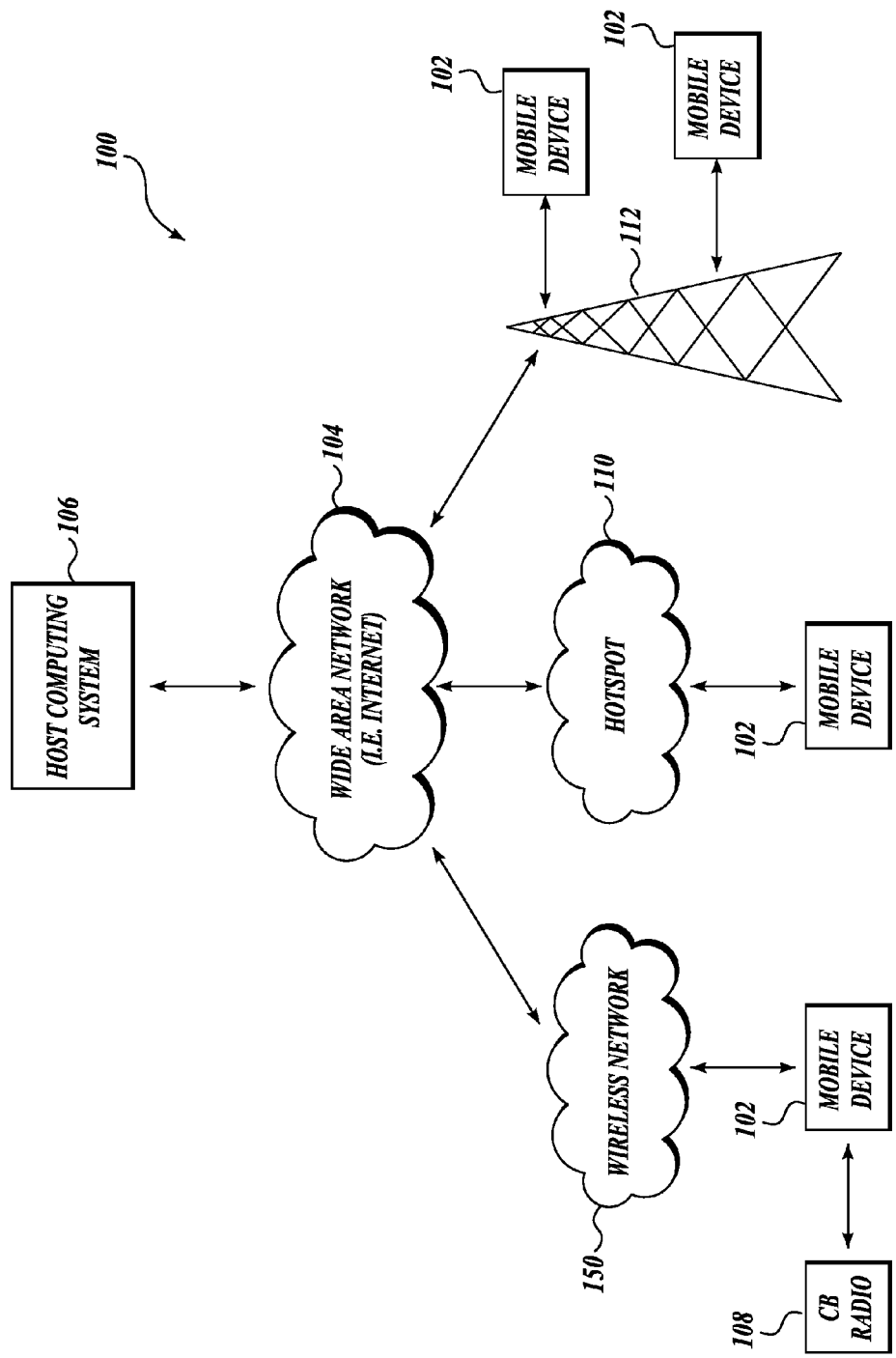
FIG. 1 is a block diagram depicting an exemplary system where embodiments of the disclosed subject matter may be implemented.

Referring now to FIG. 1, a functional block diagram of a system 100 in which aspects of the disclosed subject matter may be implemented is illustrated. In one embodiment, the system 100 depicted in FIG. 1 includes one or more mobile devices 102, a wide area network 104, and a host computing system 106. As described in further detail below, the mobile devices 102 may be installed or otherwise associated with a "vehicle" such as a truck, car, motorcycle, recreational vehicle, vessel, etc.

Users of the mobile devices 102 provided by the present disclosure are able to communicate over both traditional CB bands and using modern wireless protocols and networks (e.g., WiFi, WiMax, Bluetooth, cellular based networks, the Global Positioning System band, Dedicated Short-Range communications (DSRC), etc.). In this regard, modern wireless communication protocols and networks may be leveraged in order to communicate real-time video, audio, and data to/from the mobile devices 102. Moreover, a user is not limited to only participating in local communications as required by previous CB radios. Instead, a user may establish a network session with any device connected to the wide area network 104 (i.e., Internet). In addition to performing communications using modern wireless protocols and networks, the mobile devices 102 are configured to perform communications over traditional CB bands. Accordingly, users of the mobile devices 102 may communicate over traditional CB radio-based frequencies with a vehicle operator that utilizes the CB radio 108.

As illustrated in FIG. 1, the mobile devices 102 may establish network connections from various network access points. In one embodiment, the mobile devices 102 can establish a network connection via a wireless network 150 which includes various networks that may correspond to a number of IP-based or other networks such as DSL networks, public switched telephone networks ("PSTN") and other wire-line networks (e.g., SS7-based networks), wireless networks such as those using CDMA, GSM, IEEE 802.11x, ZigBee, UMTS, WIMAX, etc. In this instance, the wireless network 150 serves as the network access point for connecting the mobile devices 102 which utilize wireless protocols at the data link layer to the wide area network 104.

In another embodiment, the mobile devices 102 may establish a network connection from the wireless hotspot 110 which provides network connectivity within a geographic range. In some instances, the wireless hotspot 110 allows a user to establish a network connection without being a subscriber to a wireless service provided by a particular carrier. However, systems and devices that create a mobile wireless hotspot 110, which typically utilize WiFi and/or WiMax protocols, are increasingly being made available by carriers. Similar to traditional hotspots, a mobile hotspot provides the mobile devices 102 with access to network connectivity within a short range of the hotspot. As described in further detail below with reference to FIG. 2, the systems for providing the wireless hotspot 110 may be made available from a device that is separate from the mobile devices 102. Alternatively, the systems (software, hardware, etc.) which implement the wireless hotspot 110 may be integrated into the mobile devices 102.

In one embodiment, the mobile devices 102 are configured to perform vehicle-to-vehicle communication without utilizing the wide area network 104. As described in further detail below, real-time video, audio, or other data-based communications may be directly transmitted between the mobile devices 102 or over a Local Area Network ("LAN") connection. To increase the range in which vehicle-to-vehicle communications may be performed, a radio system 112 may be used to store and forward messages being transmitted between the mobile devices 102. In one embodiment, the radio system 112 is a Dedicated Short-Range Communications (DSRC) system that has a fixed infrastructure of geographically separated devices (e.g., control units, repeaters, etc.) that receive and forward network communications. Those skilled in the art and others will recognize that DSRC provides high data transfer rates and is well-suited for transmitting multimedia communications. However, DSRC is only one representative technology that may be used to extend the range in which communications may be performed. Those skilled in the art and others will recognize that radio systems other than DSRC may be employed without departing from the scope of the claimed subject matter.

In some embodiments, the mobile devices 102 can communicate with the host computing system 106 via the wide area network 104. As described in further detail below, certain network services may be provided from the host computing system 106 for managing a users communications from the mobile devices 102. In this regard, the host computing system 106 includes application logic for reading, processing, and exposing data to the mobile devices 102. In one embodiment, the host computing system 106 may include one or more data stores that stores user profile information (e.g., user account information), voicemail information, lists of contacts, group membership information, etc. Accordingly, a user's information that is relevant to the operations of the mobile devices 102 may be maintained at the host computing system 106 and delivered to the mobile device 102 when needed. This user information may also be stored and/or synchronized with information maintained on the mobile devices 102.

FIG. 1 is intended to provide a general description of one system 100 suitable for illustrating aspects of the disclosed subject matter. While FIG. 1 depicts particular devices linked together through different interfaces, those skilled in the art will appreciate that the claimed subject matter may be implemented in other contexts. In this regard, the claimed subject matter may be practiced using different types of devices, communication interfaces, and networks than those illustrated in FIG. 1.

Figure 2:
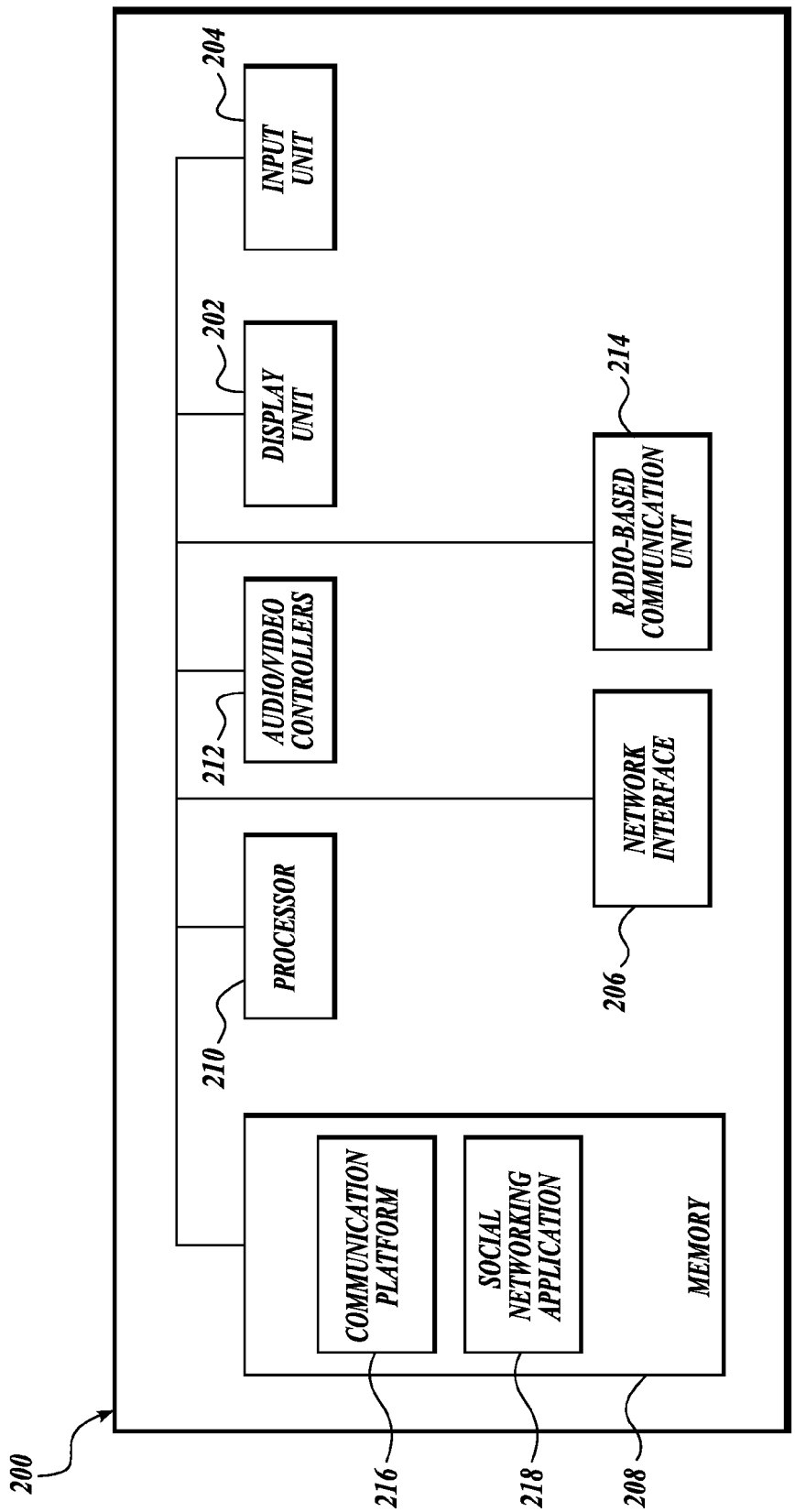
FIG. 2 is a general block diagram depicting the components of an exemplary mobile device in accordance with one embodiment of the disclosed subject matter.

Now with reference to FIG. 2, one exemplary component architecture of a mobile device 200 provided by the present disclosure will be described. As depicted in FIG. 2, the mobile device 200 comprises a display unit 202, an input unit 204, a network interface 206, a memory 208, a processor 210 (controller), audio/video controllers 212, and other components suitable for communicating with remote devices. In this regard, the processor 210 is configured to execute instructions and to carry out operations defined in applications that reside in the memory 208.

In some embodiments, the processor 210 together with an operating system (not illustrated) manages the hardware and software resources of the mobile device 200. The operating system may be any operating system including, but not limited to, Symbian OS, Microsoft® Windows Mobile OS, OS/2, Unix, Linux®, Palm® OS, OS X, Google Android®, or iPhone® operating system. Since the functions performed by an operating system are generally well known in the art, the operating system will not be described in further detail here.

The mobile device 200 also includes a display unit 202, such as a liquid crystal display (LCD) or a light emitting polymer display (LPD). In one embodiment, an input unit 204 is a touch sensitive layer of the display unit 202 that is configured to recognize a user's touches applied to the surface of the layer. For example, the position of the touches, the pressure of the touches, or general direction of the touches may be recognized by the input unit 204. In other embodiments, the input unit 204 includes controls that are separate from the display unit 202. In this instance, the input unit 204 may include separate soft keyboards (e.g., QWERTY, etc.), physical keyboards, physical buttons, scroll wheels, track balls, and the like.

The mobile device 200 may further include a network interface 206 for communicating with other devices or networks using wireless communication protocols. The network interface 206 may include communication circuitry that permits wireless communication over one or more of the IEEE 802.11 and IEEE 802.16 networks, cellular networks, public/private networks, etc. In this regard, the network interface 206 covers communications frequency bands such as the cellular telephone bands at 850 MHz, 900 MHz, 1800 MHz, and 1900 MHz, the global positioning system (GPS) band, data service bands such as the 3G data communications band (e.g., the Universal Mobile Telecommunications System (UMTS)

communication band), WiFi® (IEEE 802.11) band, Worldwide Interoperability from Microwave Access WiMax® (IEEE 802.16) band, Bluetooth® band, and the like. It should be understood that the network interface 206 may comprise other components, including transmitter/receiver circuitry for performing communications using the above-identified protocols and bands. By way of example only, these components may include but are not limited to a cellular radio or modem, a Bluetooth interface, satellite communication interface, RF communication interface, etc. In addition, the network interface 206 may include a wireless router such as a WiFi router that provides a mobile wireless hotspot. Alternatively, the mobile device 200 may be configured to communicate with a separate WiFi router (not shown) that provides a mobile hotspot as described above with reference to FIG. 1. In any event, the network interface 206 controls the front-end communications performed from the mobile device 200.

The memory 208 depicted in FIG. 2 is one example of computer-readable media suited to store data and program modules that implement aspects of the disclosed subject matter. As used herein, the term "computer-readable media" includes volatile and non-volatile and removable and non-removable memory, implemented in any method or technology capable of storing information, such as computer-readable instructions, data structures, program modules, or other data. By way of example, computer-readable media include, but are not limited to, RAM, ROM, EEPROM, flash memory, CD-ROM, digital versatile disks (DVD) or other optical disk storage, magnetic cassettes, magnetic tape, magnetic disk storage or other magnetic storage devices, or any other medium that can be used to store information for access by the processor 210.

As further depicted in FIG. 2, the mobile device 200 includes the audio/video controllers 212 that convert received digital video and audio content into a format compatible for being disseminated to a user. For example, when a video stream is received, a video controller decodes the stream and presents the decoded video on the display unit 202. In this regard, the audio/video controllers 212 may include codecs for encoding/decoding video across the range of network bandwidths that are utilized by other available communication devices. Similarly, an incoming audio stream may be processed by an audio controller in order to decode the stream and play audio data on the mobile device 200. In this regard, video and audio data may be packetized and transmitted in accordance with standards dictated by an Internet standard protocol such as the real-time transport protocol ("RTP"). However, those skilled in the art and others will recognize that RTP is only one exemplary Internet standard protocol that the audio/video controllers 212 may use for the encoding/decoding and transport of real-time video and audio data.

As further depicted in FIG. 2, the mobile device 200 includes a CB radio-based communication unit 214 for transmitting/receiving communications over CB radio bands with other devices (e.g., the CB radio 108). For ease of illustration, FIG. 2 does not depict the transmitter and receiver circuitry, analog to digital converters, amplifiers, power source, etc., which will typically be included with the radio-based communication unit 214. However, since these and other components that may be included with the radio-based communication unit 214 are known in the art, they will not be described in detail here.

As illustrated in FIG. 2, the memory 208 includes a communication platform 216 that abstracts different types of underlying communications on behalf of applications that execute on the mobile device 200. As mentioned previously, the mobile device 200 is configured to perform different types of communications depending on certain variables. For example, wireless communication protocols may be used by the mobile device 200 to perform network communications over the wireless network 150. On the other hand, the mobile device 200 may participate in communications with a remote CB radio utilizing CB radio bands. The communication platform 216 provided by the present disclosure allows applications, such as the social networking application 218, that execute on the mobile device 200 to establish different types of communication sessions. As a result, an application developer is not required to implement logic for establishing, maintaining, terminating, or otherwise managing these different types of network sessions. The functionality of the social networking application 218 and the communication platform 216 is described in further detail below.

It should be well understood that the component architecture of the mobile device 200 depicted in FIG. 2 should be construed as exemplary. In this regard, the mobile device 200 may use other components than those illustrated or be implemented in accordance with a different component architecture. Moreover, the present disclosure may be implemented on other types of devices than those devices illustrated and described with reference to FIGS. 1 and 2. As described in further detail below and by way of example only, the social networking application 218 and the communication platform 216 provided by the present disclosure may be implemented on a Personal Computer, wireless phone, navigation or entertainment device, etc. or any other computing device capable of executing computer-executable instructions.

Figure 3:
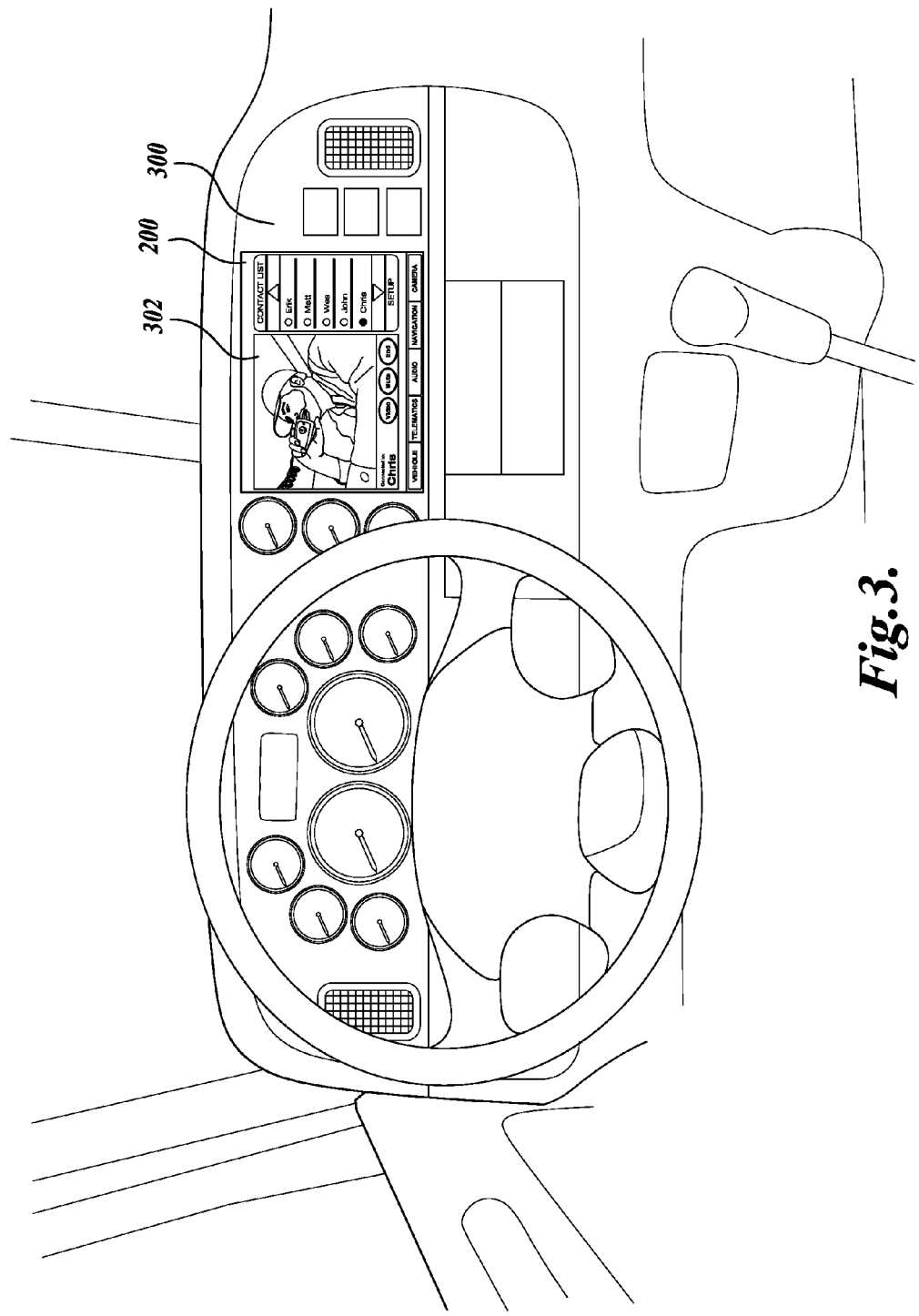
FIG. 3 is a schematic diagram depicting an exemplary configuration in which the mobile device also depicted in FIG. 2 is mounted in a vehicle.

With reference now to FIG. 3, an exemplary implementation of the mobile device 200 that is mounted and integrated in a vehicle will be described. In one embodiment, the mobile device 200 is mounted in a vehicle console 300 at a location that may be accessed by a vehicle operator and/or vehicle passenger. In this regard, the mobile device 200 includes a display screen 302 which utilizes controls and graphics to display information and obtain input from the user. Accordingly, a user may activate menu items, click buttons, select controls, or otherwise interact with graphical elements that are presented on the display screen 302 to provide input. For example, controls presented on the display screen 302 allow a user to initiate different types of communications with other users. As described in further detail below, a user may select a control to initiate a video, audio, and/or other data-based network session with a particular contact.

In the exemplary embodiment depicted in FIG. 3, the mobile device 200 is integrated into other vehicle systems such as a vehicle audio system. For ease of illustration and because it is not important for an understanding of the claimed subject matter, FIG. 3 does not show some of the typical output devices that may be connected to the mobile device 200 such as speakers, wired or wireless headsets, car stereo, and the like. For the same reasons, FIG. 3 does not show some of the input devices that may be used by the mobile device 200 such as a CB handset, microphone, keyboard, camera, etc.

Figure 4A:
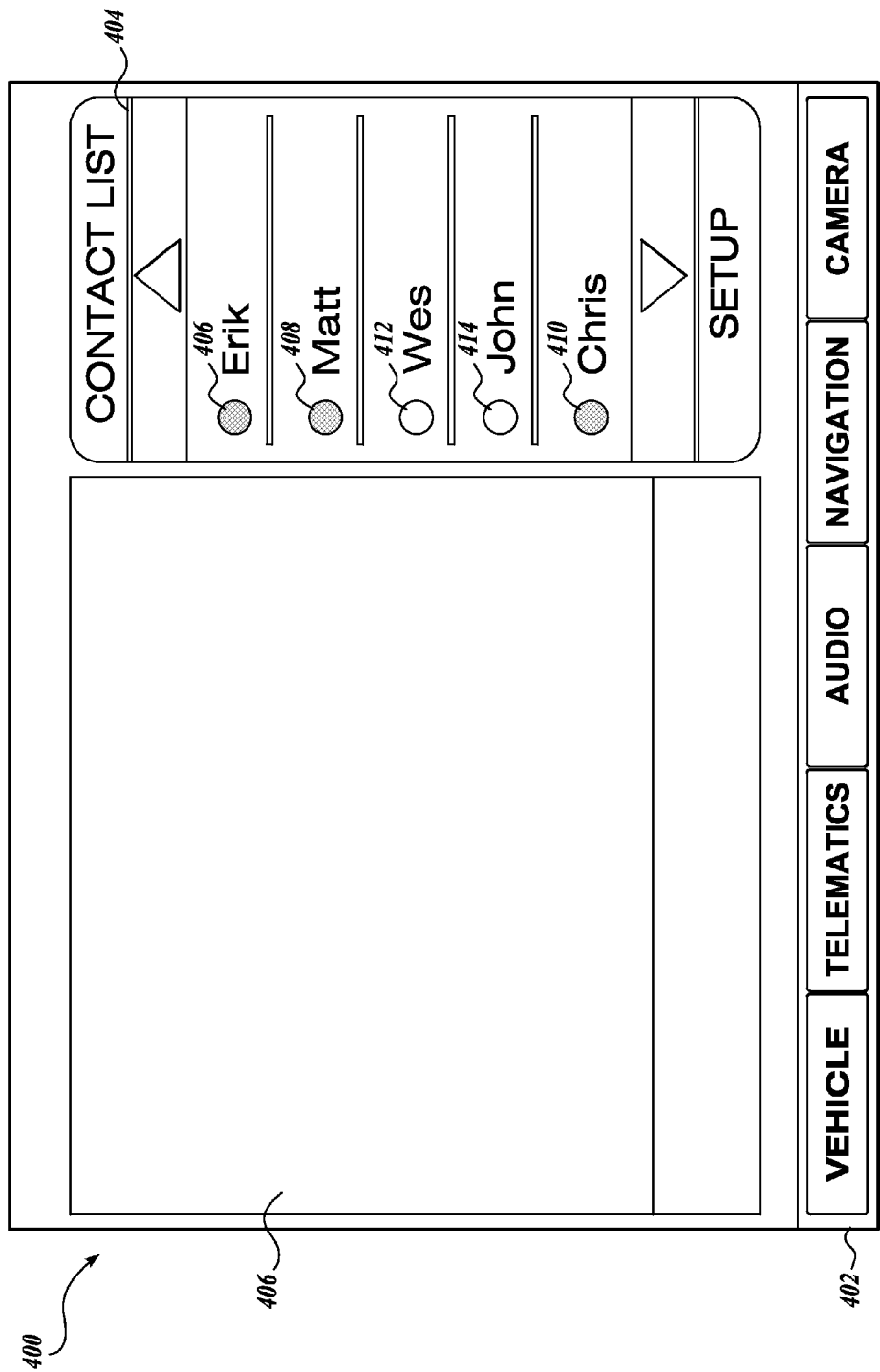
FIG. 4A-B are exemplary user interfaces depicting aspects of a social networking application in accordance with additional embodiments of the disclosed subject matter.

Now with reference to FIGS. 4A-B, exemplary user interfaces of a social networking application 218 (FIG. 2) provided by the present disclosure will be described. As depicted in FIG. 4A, the user interface 400 of the social networking application includes a program selection toolbar 402, a contacts list 404, and a video display area 406. By interacting with the program selection toolbar 402, the user may activate a particular application (i.e., audio player, camera application, vehicle navigation, etc.). In the example depicted in FIG. 4A, a social networking application that allows a user to establish different types of communication sessions is active.

As illustrated, the social networking application causes the contacts list 404 to be displayed which identifies a set of contacts or other users. To facilitate communications, a user may create a "tag" for identifying the user within a group or community. As described in further detail below, the availability of a user to participate in communications may be broadcast to other users or groups of users. Similarly, a user may establish settings to register and "listen" for the availability of others to participate in a communication session. When a contact becomes available, the mobile device 200 may provide a visual, auditory, or other indicator that notifies the user regarding the availability of a contact. In the example depicted in FIG. 4A, the icons 406, 408, and 410 may be displayed in a first pattern to indicate that an associated contact is available to participate in a communication session. On the other hand, icons 412 and 414 may be displayed in a second pattern to indicate that an associated contact is unavailable.

The social networking application provided by aspects of the present disclosure allows users to create and become members of a group. Each group member may login and be notified of the communication status of other group members. At login, the social networking application may prompt or automatically obtain user credentials, such as a password, user identifier, etc. Accordingly, data is maintained on the mobile device 200 that describes a collection of memberships or associations between a user and one or more groups. Each membership may have a separate user identifier, which will be shown to other members of the group, thus creating an identity for the user within the context of the group. In one embodiment, a user may provide input to select a particular group or community and have members of the group or community displayed in the contacts list 404.

Now with reference to FIG. 4B, another exemplary user interface 450 that illustrates additional aspects of the present disclosure will be described. Similar to the description provided above with reference to FIG. 4A, the user interface 450 depicted in FIG. 4B includes the program selection toolbar 402, the contacts list 404, and the video display area 406. However, a communication session in which video, audio, and/or data-based communication can be transmitted between remote devices has been established. For example, the communication session may have been initiated by a selection of the "CHRIS" entry 416 presented on the user interface 400. As illustrated in FIG. 4B, the video display region 406 may be used to present real-time video that is streamed from a remote device. Information about the contact may be presented on the video display region 406 along with a plurality of selectable buttons, such as a "VIDEO" button 452, a "MUTE" button 454, and "END" button 456. By activating the "VIDEO" button 452, a user may initiate/terminate the transmission of video data. Similarly, a user may cease or resume the transmission of audio data by activating the "MUTE" button 454. Moreover, the communication session may be terminated by activating of the "END" button 456.

Figure 4B:
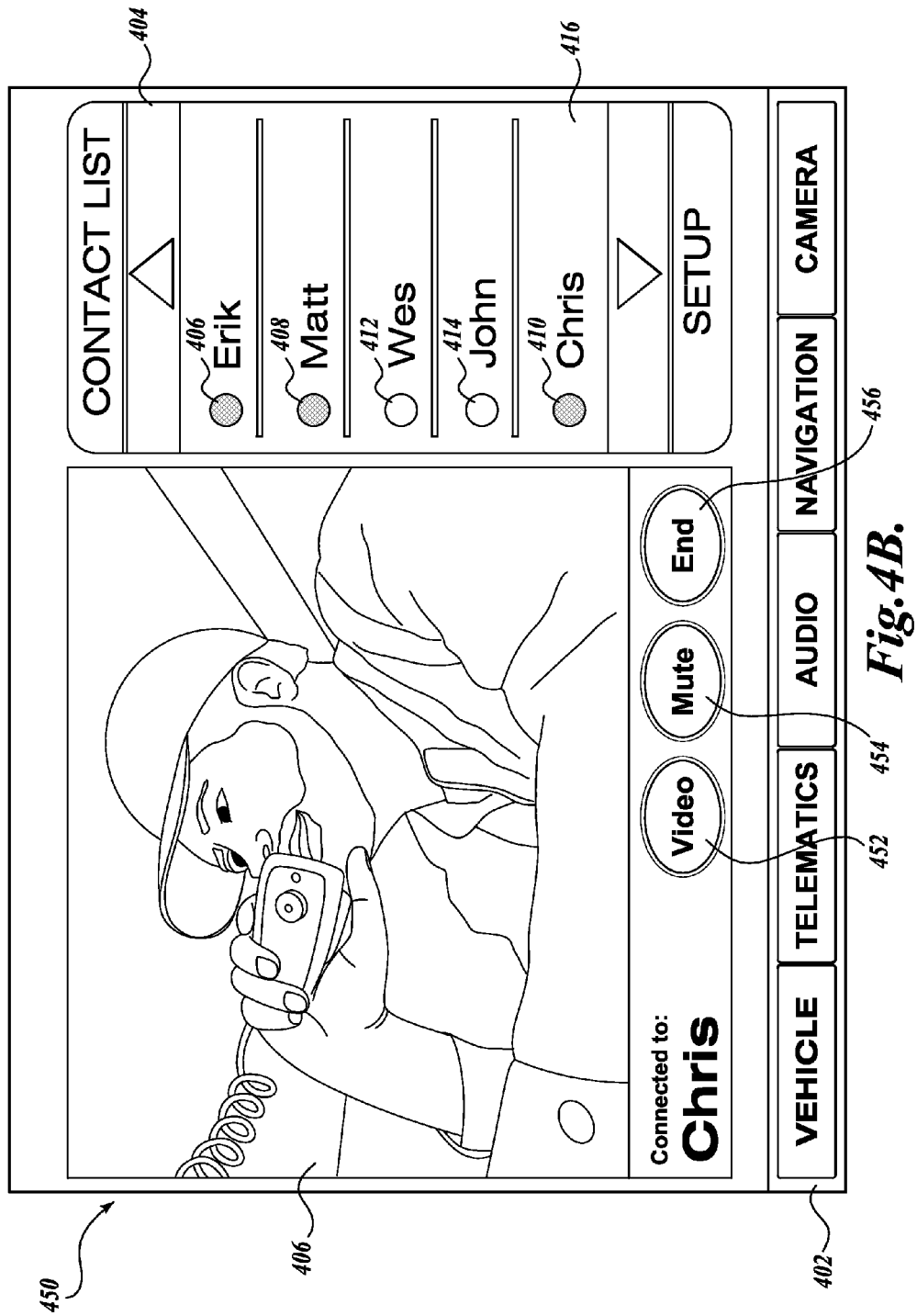

Those skilled in the art and others will recognize that the description provided above with reference to FIGS. 4A-B provides exemplary graphical user interfaces. However, the features of the present disclosure may be implemented using different types of user interfaces. For example, the user interface of the mobile device 200 does not have to be graphically based but may be rendered as a text display without graphical components, provided via audio prompts and voice recognition, accessed from an API or library routine, and the like. Accordingly, the features of the user interfaces 400 and 450 described above with reference to FIGS. 4A-B should be construed as exemplary and not limiting.

Figure 5:
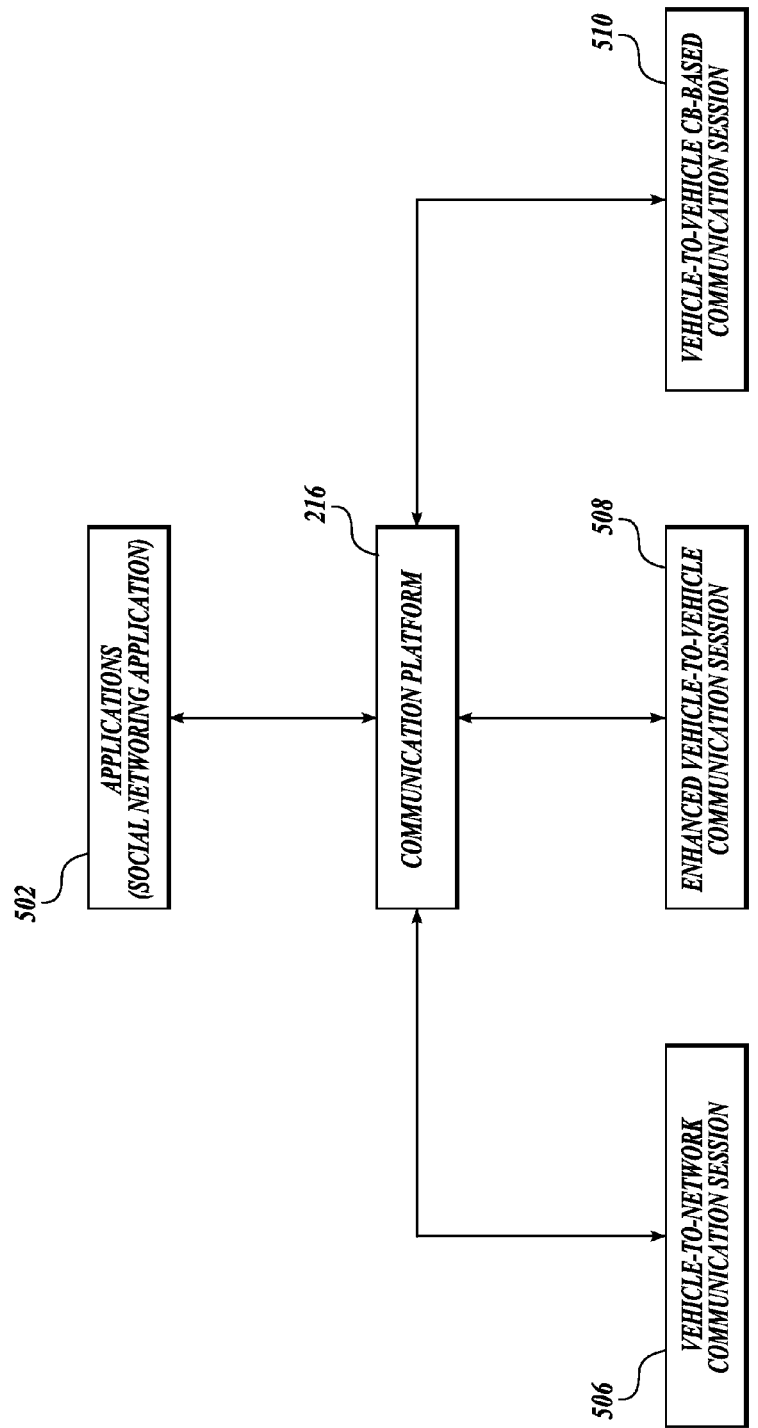
FIG. 5 is a block diagram depicting exemplary communication sessions that may be established in accordance with additional embodiments of the disclosed subject matter.

Now with reference to FIG. 5, an overview of the different types of underlying communications that may be performed using the communication platform 216 (FIG. 2) will be described. As mentioned previously, the mobile device 200 provided by the present disclosure is configured to perform different types of communications. As illustrated in FIG. 5, applications 502, such as the social networking application 218, may call the communication platform 216 in order to create an instance of a communication session with a remote device. In this regard, the applications 502 may cause the communication platform 216 to establish one of a number of different types of sessions including a vehicle-to-network communication session 506, an enhanced vehicle-to-vehicle communication session 508, and a vehicle-to-vehicle CB-based communication session 510. Regardless of the type of session established, the communication platform 504 provided by the present disclosure implements logic to manage the communication session. Accordingly, the applications 502 that execute on the mobile device 200 do not require specific knowledge or logic for managing the communication session. Having a unified way in which the applications 502 can create instances of communication sessions simplifies application development for the mobile device 200. The applications 502 are not required to manage communication sessions and may rely on the communication platform 216 to perform different types of communications with a remote device.

Three exemplary types of communication sessions capable of being established by the communication platform 216 are illustrated in FIG. 5. One exemplary communication session is the vehicle-to-network communication session 506 that allows the user of the mobile device 200 to communicate over the wide area network 104 (FIG. 1). In this embodiment, the applications 502 that execute on the mobile device 200 are able to utilize all of the resources available from the Internet. For example, in the vehicle-to-network communication session 506, the mobile device 200 may leverage an Internet telephony system to perform communications. In an Internet telephony system which frequently uses the Voice Over Internet Protocol (VoIP), data is processed into a sequence of data blocks, called packets, for transmission utilizing an Internet Protocol (IP) data network. In addition to being portable and flexible, Internet telephony systems are able to establish and control multimedia communications (i.e., video, audio, and/or data). In the vehicle-to-network communication session 506, Internet-based applications including, but not limited to Ebay® Skype, Google® Video, etc., may be used on the mobile device 200. In this embodiment, data may be exchanged with any device connected to the Internet thereby allowing a user to maintain contact with a dispatch facility, family, other vehicle operators, etc.

As further illustrated in FIG. 5, another exemplary communication session that may be established from the mobile device 200 is the enhanced vehicle-to-vehicle communication session 508. In this instance, remote devices exchange data without causing the data to be routed over the Internet. Instead, data packets are transmitted between the mobile devices 102 over a range that is supported given the applicable protocol and available networking infrastructure. Since IP-based communication protocols are used, real-time video, audio, and/or data may be transmitted between the mobile devices 102 in an enhanced vehicle-to-vehicle communication session 508. The communication link between devices participating in the vehicle-to-vehicle communication session 508 may be direct such that intermediary devices are not used to extend the range in which communications may be performed. Alternatively, the mobile devices 102 may establish and use a Local Area Network ("LAN") connection for data transmission. In this embodiment, the range in which data may be exchanged during the vehicle-to-vehicle communications session 508 can be extended. For example, the radio system 112 (FIG. 1) may use a series of repeaters that receive and forward data packets between mobile devices 102 that are participating in an enhanced vehicle-to-vehicle communication session 508.

Another exemplary communication session in which the mobile devices 102 may participate is the CB-based vehicle-to-vehicle communication session. As the name suggests, the CB-based vehicle-to-vehicle communication session 510 involves participating in communication over the CB radio bands. In this instance, a transmitter/receiver configured to transmit over CB radio bands is used by the mobile devices 102 to transmit/receive audio-based communications. As a result, a user may communicate with others that utilize a traditional CB radio 108 without being required to use multiple devices to participate in different types of communication sessions.

Significantly, the functionality of the communication platform 216 and the social networking application 218 illustrated and described with reference to FIGS. 3-5, does not rely on particular hardware components or platform. Accordingly, aspects of the claimed subject mater are not tied to a particular device, operating system, application platform, etc. Moreover, the communication platform 216 and the social networking application 218 do not need to be "bundled" and/or distributed with a particular device such as the mobile device 200 (FIG. 2), Personal Computer, mobile phone, etc. Instead, the communication platform 216 and the social networking application 218 can be implemented on any type of device capable of executing computer-executable instructions or may be implemented and distributed as a standalone application separate from any hardware.

Figure 6:
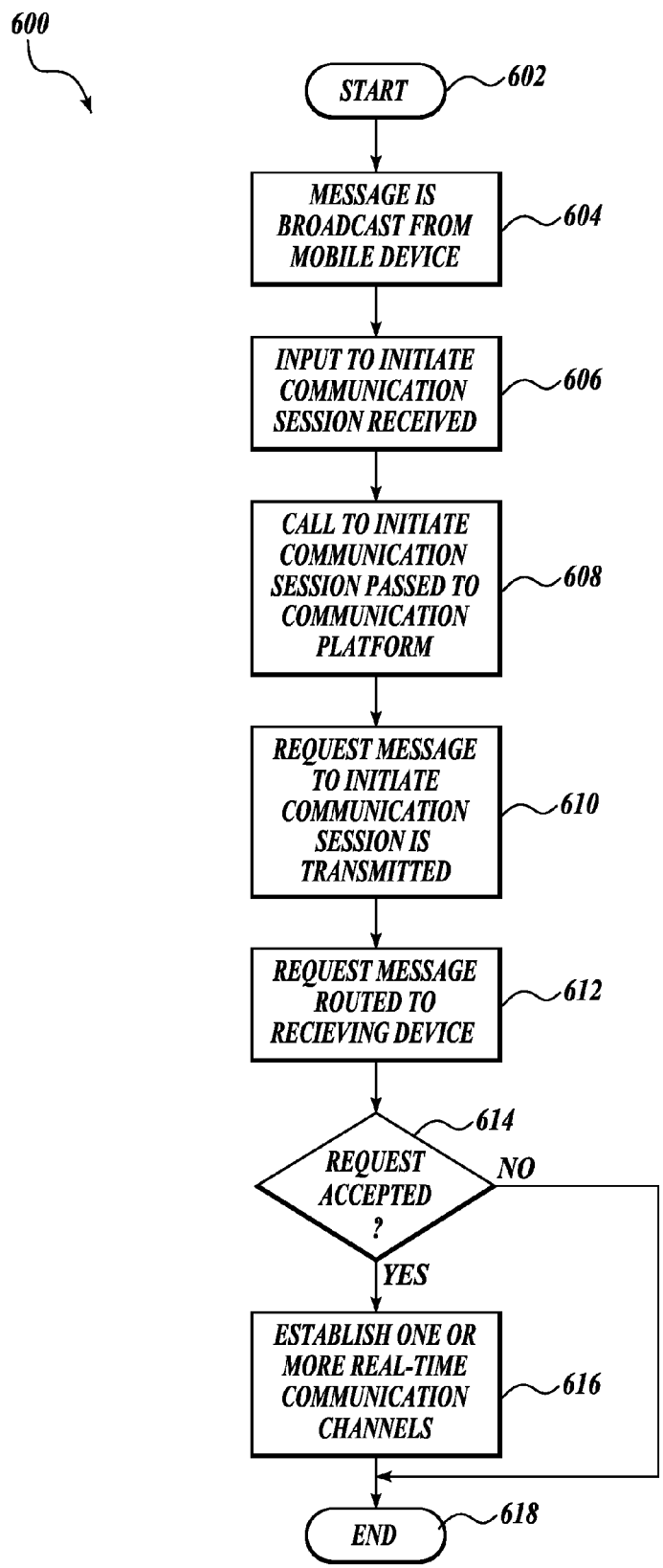
FIG. 6 is a flow diagram of a initiation routine that initiates a communication session between remote devices in accordance with additional embodiments of the disclosed subject matter.

Now, with reference to FIG. 6, an exemplary initiation routine 600 in which a communication session is established using the mobile device 200 (FIG. 2) will be described. As mentioned previously, a user may broadcast their availability to participate in a communication session and register as a listener with regard to the communication availability of others. The exemplary initiation routine 600 depicted in FIG. 6 is described in the context of establishing a communication session in this exemplary embodiment in which users broadcast their availability. However, those skilled in the art and others will recognize that the concepts described below may be applied in other contexts without departing from the scope of the claimed subject matter. With continuing reference to FIGS. 1-5 and the accompanying descriptions, the initiation routine 600 will now be described.

As illustrated in FIG. 6, the initiation routine 600 begins at block 602 and at block 604 a message is broadcast from the mobile device 200 to inform others about the availability of a user to participate in a communication session. The mobile device 200 provided by the present disclosure may be configured to periodically transmit a standard message that informs others about a user's communication status. As described above with reference to FIGS. 4A-B, an application on the receiving device may process the standard message and provide an indicator as to the availability of a user. In this regard, the message may be formatted in a way so that it can be processed by third-party devices and/or applications. Alternatively, aspects of the present disclosure may provide the device and/or application that processes the standard message.

Settings may be defined that affect how messages which describe the availability of a user are transmitted and processed. In one embodiment, the social networking application 218 is configured so that a user is notified whenever a contact is available. Alternatively, settings may be established so that a user is only notified that a contact is available when the contact is identified as being within a particular geographic range (i.e. 5 miles). Similarly, a user may establish settings so that the message transmitted from the mobile device 200, at block 602, is only broadcast over a defined radius. By way of another example, the social networking application 218 may be configured to only allow communications between particular users. An entity such as a fleet operator may establish settings so that only vehicle operators within the fleet are able to exchange messages or otherwise communicate. However, these are just examples on some of the ways in which communications from the mobile device 200 may be configured.

At block 606 of the initiation routine 600, the mobile device 200 receives input to initiate a communication session. A user may activate a selectable control defined by an application executing on the mobile device 200 in order to initiate a communication session. For example, at block 606, the user may select one of the controls available from the user interfaces 400 and 450 described above with reference to FIGS. 4A-4B to initiate a video, audio, and/or other data-based communication session.

As further illustrated in FIG. 6, at block 608, a function call to initiate the communication session is issued to the communication platform 216 provided by the present disclosure. As mentioned previously, the communication platform 216 (FIG. 2) abstracts different types of underlying communications on behalf of applications that execute on the mobile device 200. Accordingly, an application can create instances of different types of communication sessions using an Application Programming Interface (API), library routines, and/or other functions exposed by the communication platform 216. By way of example, an application may initiate a communication session in which video and audio is streamed between remote devices by making the appropriate call to the communication platform 216, at block 608. In addition, other types of data and information may be accessed by applications using the communication platform 216. By way of example, applications executing on the mobile device 200 may generate requests to access network servers hosting XML Web services, REST services, XML resources, RSS or Atom feeds, HTML (Hypertext Markup Language) based Web sites, among others.

At block 610 of the initiation routine 600, a request message to initiate a communication session with a remote device is formulated and transmitted. Within the mobile device 200, the communication platform 216 is responsible for causing outgoing messages to be formulated and transmitted. Upon receiving the call from an application, at block 608, the communication platform 216 identifies the type of communication session that will be established. Then, at block 610, an outgoing message to initiate the communication session is encapsulated into the appropriate communication format. In this regard, aspects of the present disclosure may utilize an application layer control protocol such as the Session Initiation Protocol (SIP) to manage the life of the communication session. As known in the art, SIP is an exemplary control protocol that may be used to initiate, modify, and/or terminate network sessions in which real-time communications are exchanged. However, other protocols may be used to exchange control information and otherwise manage a communication session. For example, control information may be exchanged between devices using other control protocols, such as, but not limited to, Simple Object Access Protocol (SOAP), the Extensible Messaging and Presence Protocol ("XMPP"), etc.

At block 612 of the initiation routine 600, the request message to participate in the communication session is routed to the appropriate receiving device. In one embodiment, the request message is routed over the wide area network 104 to a receiving device which may be a personal computer, laptop computer, mobile phone, another mobile device, personal digital assistant, and the like. The receiving device processes the received message and provides a visual, auditory, and/or data-based indicator requesting that the user participate in a communication session. Those skilled in the art and others will recognize that causing a message to be routed to the appropriate receiving device may be performed, at block 612, using techniques generally known in the art. However, it should be well understood that the message may be transmitted in accordance with the embodiments described above. In particular, the message to initiate the communication session may be routed over the wide area network 104 when a vehicle-to-network communication session 506 is being established. Moreover, when an enhanced vehicle-to-vehicle communication session 508 is initiated, the message may be transmitted directly between vehicles, over a local area network, and/or using the radio system 112, as described above.

By routing the message to the appropriate receiving device, a remote user may be notified of the incoming request to establish a communication session. Then, a determination is made regarding whether the request to establish a communication session was accepted, at decision block 614. A user that is invited to participate in a communication session may provide input to accept the invitation. In this instance, the result of the determination made at decision block 614 is "YES" and the initiation routine 600 proceeds to block 616, described in further detail below. Conversely, if the user does not accept the invitation to participate in the communication session, the result of the determination made at decision block 614 is "NO" and the initiation routine 600 proceeds to block 618, where it terminates.

If the invitation to participate in the communication session is accepted, the initiation routine 600 proceeds to block 616 where one or more real-time communication channels is established. As mentioned previously, the one or more real-time communication channels established at block 616 may include channels used for transmitting video, audio, and/or other data-based communications. Establishing the one or more real-time communication channels, at block 616, may include transmitting additional messages between the devices that will participate in the communication session. For example, a message indicating that a contact accepted the invitation to participate in the communication session will typically be transmitted back to a mobile device 200 where the request originated. As a result, the user interface on the mobile device 200 may be updated to reflect that a communication session has been established with a particular contact. Then, the initiation routine 600, proceeds to block 618, where it terminates.

It should be well understood that the initiation routine 600 described above with reference to FIG. 6 does not show all of the functions performed when initiating a communication session. Instead, the initiation routine 600 describes exemplary embodiments of the disclosed subject matter. Those skilled in the art and others will recognize that some functions may be performed in a different order, omitted/added, or otherwise varied without departing from the scope of the claimed subject matter.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A non-transitory computer-readable medium having computer-executable components, comprising:
   a user interface component configured to display information and obtain user input via a user interface of an in-vehicle communication device integrated with a vehicle-to-vehicle communication system in a vehicle;
   a communication platform configured to manage different types of communication sessions for the in-vehicle communication device wherein the communication platform is further configured to broadcast a user identifier indicating the user is available to participate in a communication session, and to receive a plurality of broadcast contact identifiers, each broadcast contact identifier associated with one of a plurality of contacts, wherein the contact identifiers are broadcast by associated remote devices over a limited geographical range;
   a social networking application configured to allow users to become members of a group, and to cause the user interface component to display on the user interface a list of the members of the group that indicates the availability of each member of the group to participate in a communication session, wherein the availability of the members of the group is determined by the received broadcast contact identifiers;
   wherein the social networking application is further configured to receive an input from the user interface indicating a selected one of the available members of the group and upon receipt of the input to cause the communication platform to transmit an invitation to the associated remote device to initiate a communication session, wherein acceptance of the invitation by the associated remote device will initiate a vehicle-to-vehicle communication session, and further wherein the social networking application is selectively operable to conduct the communication session via a CB radio unit.

2. The non-transitory computer-readable medium as recited in claim 1, wherein the social networking application is further configured to establish a vehicle-to-network communication session in which a message is transmitted to a computing device.

3. The non-transitory computer-readable medium as recited in claim 1, wherein the social networking application is further configured to establish a vehicle-to-vehicle communication session in which a message is transmitted over a local area network or cellular connection.

4. The non-transitory computer-readable medium as recited in claim 1, wherein the vehicle-to-vehicle communication session comprises a real-time audio and video data-based communication session.

5. The non-transitory computer-readable medium as recited in claim 1, wherein the vehicle-to-vehicle communication session is selected from the group consisting of:
   a session in which data communicated with the associated remote device is routed over the Internet;
   a session in which data communicated with the associated remote device is routed over a cellular network; and a session in which data is communicated directly with the associated remote device.

6. The non-transitory computer-readable medium as recited in claim 5, wherein a range in which data is communicated with the associated remote device in the vehicle-tovehicle communication session is extended by a radio system that utilizes a fixed infrastructure to store and forward received messages.

7. The non-transitory computer-readable medium as recited in claim 1, wherein the communication platform executes on one of the following types of devices: a computer, a mobile phone, an in-vehicle navigation/entertainment device, and a CB radio.

8. The non-transitory computer-readable medium as recited in claim 1, wherein the communication platform is further configured to cause audio data to be transmitted to a remote CB radio unit.

9. The non-transitory computer-readable medium as recited in claim 1, wherein the communication session is a vehicle-to-vehicle communication session in which data that is exchanged with the associated remote device is routed over a wireless network.

10. The non-transitory computer-readable medium as recited in claim 9, wherein the wireless network includes a cellular network.

11. The non-transitory computer-readable medium as recited in claim 9, wherein the wireless network includes a local area network.

12. The non-transitory computer-readable medium as recited in claim 1, wherein the geographic range may be configured by a user.

* * * * *